(12) United States Patent
Prasad et al.

(10) Patent No.: US 9,948,704 B2
(45) Date of Patent: Apr. 17, 2018

(54) DETERMINING A BEST FIT COORDINATOR NODE IN A DATABASE AS A SERVICE INFRASTRUCTURE

(71) Applicant: INTERNATIONAL BUSINESS MACHINES CORPORATION, Armonk, NY (US)

(72) Inventors: Ramya H. Prasad, Pine Brook, NJ (US); Girish Sundaram, Pine Brook, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 15/093,361

(22) Filed: Apr. 7, 2016

(65) Prior Publication Data

US 2017/0295223 A1    Oct. 12, 2017

(51) Int. Cl.
*H04L 29/08*    (2006.01)
*G06F 17/30*    (2006.01)

(52) U.S. Cl.
CPC ...... *H04L 67/1008* (2013.01); *G06F 17/3056* (2013.01); *G06F 17/30345* (2013.01);
(Continued)

(58) Field of Classification Search
CPC ............. H04L 67/1008; H04L 67/1004; H04L 67/1012; H04L 51/26; G06F 17/30575;
(Continued)

(56) References Cited

U.S. PATENT DOCUMENTS 6,542,739 B1 * 4/2003 Garner ............... H04B 7/18539
455/1
8,850,132 B1 * 9/2014 Dhavale .................. G06F 13/28
711/147
(Continued)

FOREIGN PATENT DOCUMENTS

EP          2447898 A2     5/2012
WO      2013156826 A1   10/2013
(Continued)

OTHER PUBLICATIONS

Qu Y, et al., "A resilient, fault-tolerant and high-efficient replication algorithm for distributed cloud storage", In Parallel Processing (ICPP), 2012 41st International Conference on Sep. 10, 2012 (pp. 520-529). IEEE.

*Primary Examiner* — Le H Luu
(74) *Attorney, Agent, or Firm* — Cantor Colburn LLP (57) ABSTRACT

A computer-implemented method for determining a coordinator node in a database as a service (DBaaS) infrastructure includes receiving, via a processor on a receiving node, an application connect request having data request information, where the data request information refers to data stored in the DBaaS infrastructure and includes a predefined priority metric, selecting, via the processor, a candidate node in the DBaaS infrastructure, determining, via the processor, whether the candidate node is overloaded, comparing, via the processor, responsive to determining that the candidate node is not overloaded, the predefined priority metric to at least one predefined node priority, writing, to a memory, a comparison record indicative of a comparison of the predefined priority metric with the at least one predefined node priority in the candidate node, where comparison record is stored in a catalog table, and selecting, via the processor, the candidate node as the coordinator node.

20 Claims, 5 Drawing Sheets

(52) U.S. Cl.
CPC .... *G06F 17/30575* (2013.01); *H04L 67/1004* (2013.01); *H04L 67/1012* (2013.01)

(58) Field of Classification Search
CPC ........... G06F 17/30345; G06F 17/3056; G06F 9/5088; G06F 9/45558; G06F 13/28; H04W 52/0209; H04W 28/0284; H04W 16/14; H04B 7/18539
See application file for complete search history.

(56) References Cited

U.S. PATENT DOCUMENTS

| | | | |
|---|---|---|---|
| 2010/0162261 A1* | 6/2010 | Shashidhara | G06F 9/5088 718/105 |
| 2011/0302583 A1 | 12/2011 | Abadi et al. | |
| 2012/0265881 A1 | 10/2012 | Chen et al. | |
| 2014/0120837 A1* | 5/2014 | Abiri | H04W 16/14 455/41.2 |
| 2014/0324881 A1 | 10/2014 | Ransil et al. | |
| 2015/0134796 A1 | 5/2015 | Theimer et al. | |
| 2015/0341874 A1* | 11/2015 | Nguyen-Dang | H04W 52/0209 370/350 |
| 2016/0249248 A1* | 8/2016 | Ronneke | H04W 28/0284 |
| 2016/0328257 A1* | 11/2016 | Hudzia | G06F 9/45558 |
| 2017/0230324 A1* | 8/2017 | Seigel | H04L 51/26 |

FOREIGN PATENT DOCUMENTS

| | | |
|---|---|---|
| WO | 2014039739 A1 | 3/2014 |
| WO | 2014071094 A3 | 5/2014 |

\* cited by examiner

DETERMINING A BEST FIT COORDINATOR NODE IN A DATABASE AS A SERVICE INFRASTRUCTURE

BACKGROUND

The present disclosure relates to cloud database environments, and more specifically, to determining a best fit coordinator node in a database as a service (DBaaS) infrastructure.

Database partitioning and distributing data across a number of physical machines (also called as nodes) is a common practice in online transaction processing (OLTP) and data warehousing environments. Data partitioning ensures that all the available system resources are optimally used by making sure that data is distributed uniformly across the various available machines. In addition, the process of selecting the coordinator node in current systems is decided either by the application (by hard coding in the application) or by a load balancing software operating on the receiving device. Conventional coordinator node selection methods only consider the load on a particular server without taking into consideration the optimal node in the database as a service (DBaaS) environment best equipped to manage a particular application query based on the physical location and characteristic of the data being requested.

SUMMARY

According to an embodiment of the present invention, a computer-implemented method for determining a coordinator node in a database as a service (DBaaS) infrastructure is described. The method may include receiving, via a processor on a receiving node, an application connect request having data request information, where the data request information refers to data stored in the DBaaS infrastructure and includes a predefined priority metric. The method may further include selecting, via the processor, a candidate node in the DBaaS infrastructure, determining, via the processor, whether the candidate node is overloaded, comparing, via the processor, responsive to determining that the candidate node is not overloaded, the predefined priority metric to at least one predefined node priority, and writing, to a memory, a comparison record indicative of a comparison of the predefined priority metric with the at least one predefined node priority in the candidate node. In some aspects the comparison record is stored in a catalog table. The method may further include selecting, via the processor, the candidate node as the coordinator node.

According to other embodiments, a system for determining a coordinator node in a database as a service (DBaaS) infrastructure is described. The system may include a processor configured to receive, on a receiving node, an application connect request having data request information, where the data request information refers to data stored in the DBaaS infrastructure and includes a predefined priority metric. The processor may be further configured to select a candidate node in the DBaaS infrastructure, determine whether the candidate node is overloaded, and compare, responsive to determining that the candidate node is not overloaded, the predefined priority metric to at least one predefined node priority. The processor may also write a comparison record indicative of a comparison of the predefined priority metric with the at least one predefined node priority in the candidate node, where the comparison record is stored in a catalog table, and select the candidate node as the coordinator node.

According to yet other embodiments, a non-transitory computer-readable storage medium is described. The non-transitory storage medium may include program instructions that are executable by a processor to perform a method for determining a coordinator node in a database as a service (DBaaS) infrastructure. The method may include receiving, on a receiving node, an application connect request having data request information, where the data request information refers to data stored in the DBaaS infrastructure and includes a predefined priority metric. The method may further include selecting a candidate node in the DBaaS infrastructure, determining whether the candidate node is overloaded, comparing, responsive to determining that the candidate node is not overloaded, the predefined priority metric to at least one predefined node priority, and writing, to a memory, a comparison record indicative of a comparison of the predefined priority metric with the at least one predefined node priority in the candidate node. In some aspects the comparison record is stored in a catalog table. The method may further include selecting the candidate node as the coordinator node.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least four service models, and at least four deployment models.

Characteristics of a Cloud Model:

On-demand self-service: a cloud consumer can unilaterally provision computing capabilities, such as server time and network storage, as needed automatically without requiring human interaction with the service's provider.

Figure 3:
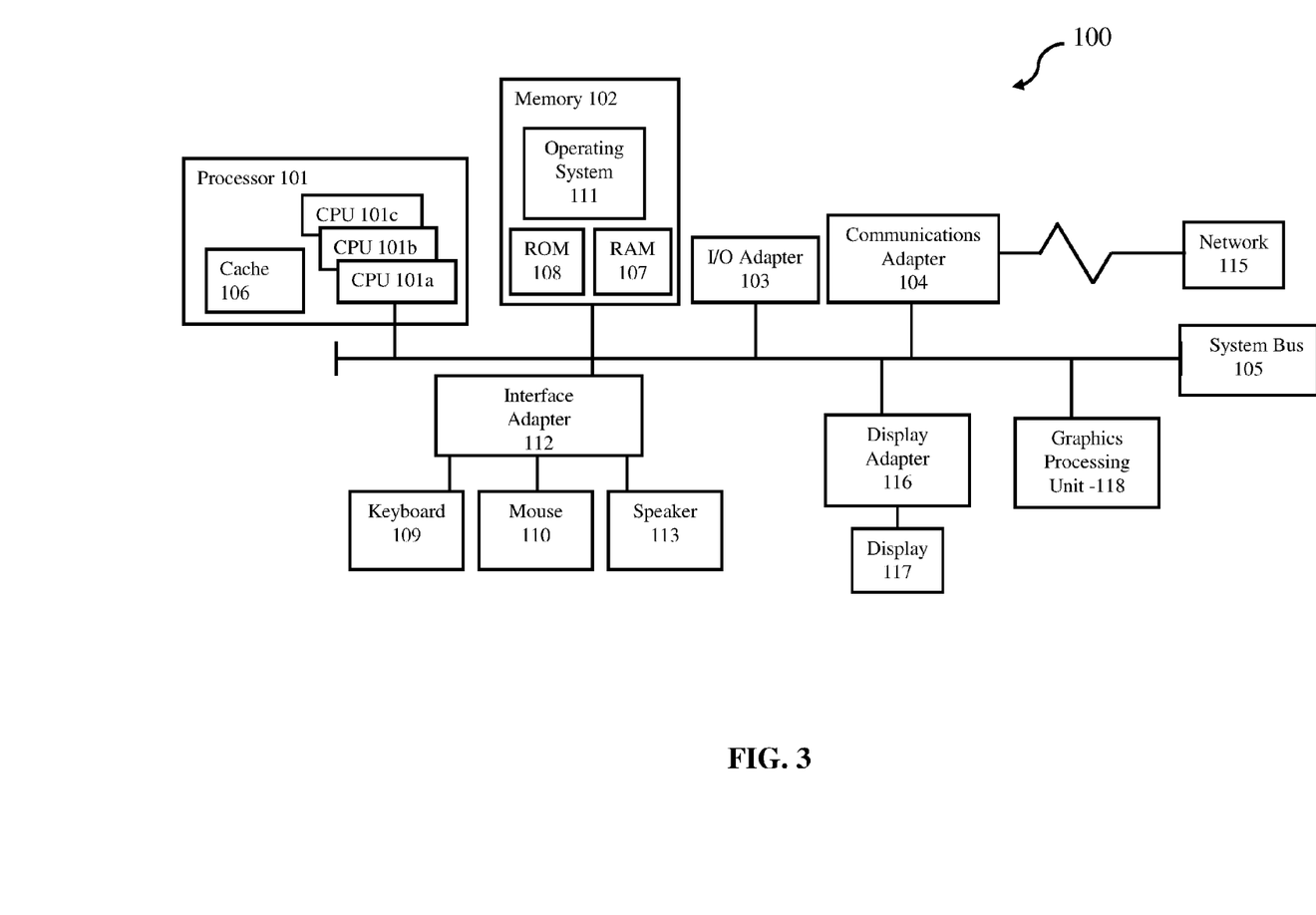
FIG. 3 depicts a block diagram of a computer system for use in practicing the teachings herein.

Broad network access: capabilities are available over a network (e.g., network 112, as depicted in FIG. 3) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 112, as depicted in FIG. 3), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 112), servers, operating systems, or storage, but has control over the deployed applications and possibly application hosting environment configurations.

Infrastructure as a Service (IaaS): the capability provided to the consumer is to provision processing, storage, networks (e.g., network 112), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 1:
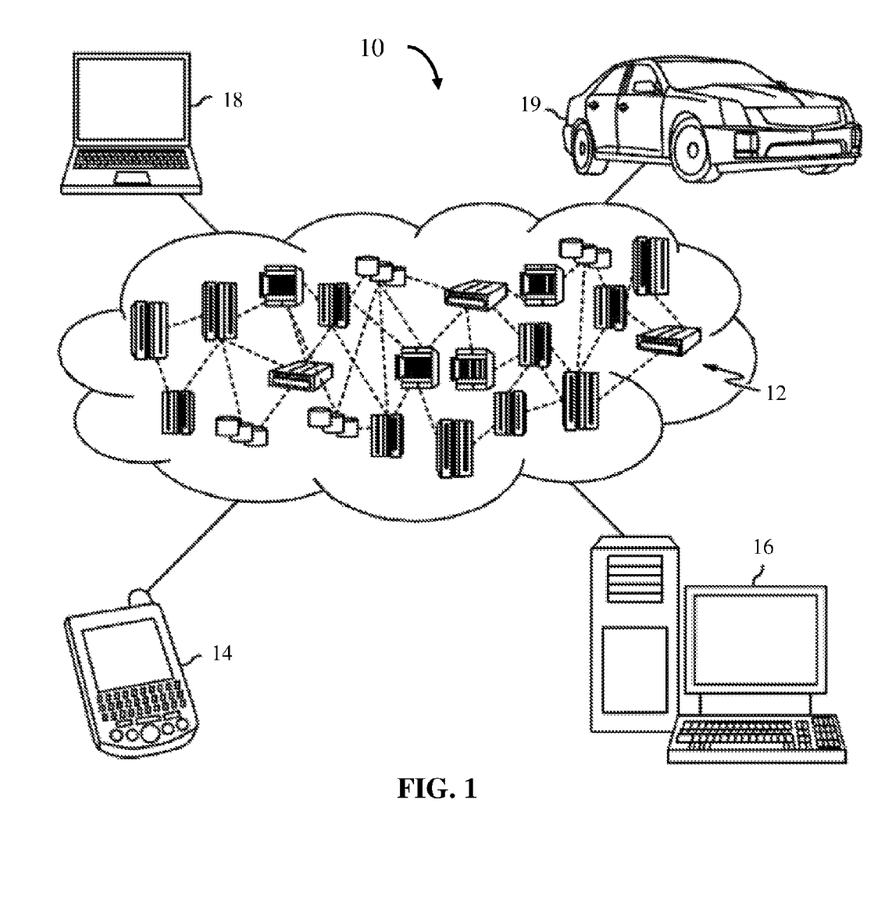
FIG. 1 depicts a cloud computing environment for use in practicing the teachings herein.

Referring now to FIG. 1, a cloud computing environment 10 for use in practicing the teachings herein is depicted. As shown in FIG. 1, cloud computing environment 10 comprises one or more cloud computing nodes 12 with which local computing devices used by cloud consumers, such as, for example, a mobile device 14, a desktop computer 16, a laptop computer 18, and/or an automobile computer system 19 may communicate. Nodes 12 may communicate with one another. They may be grouped (not shown) physically or virtually, in one or more networks, such as a Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 14-19 shown in FIG. 1 are intended to be illustrative only and that cloud computing nodes 12 and cloud computing environment 10 can communicate with any type of computerized device over any type of network and/or network addressable connection (e.g., using a web browser).

Figure 2:
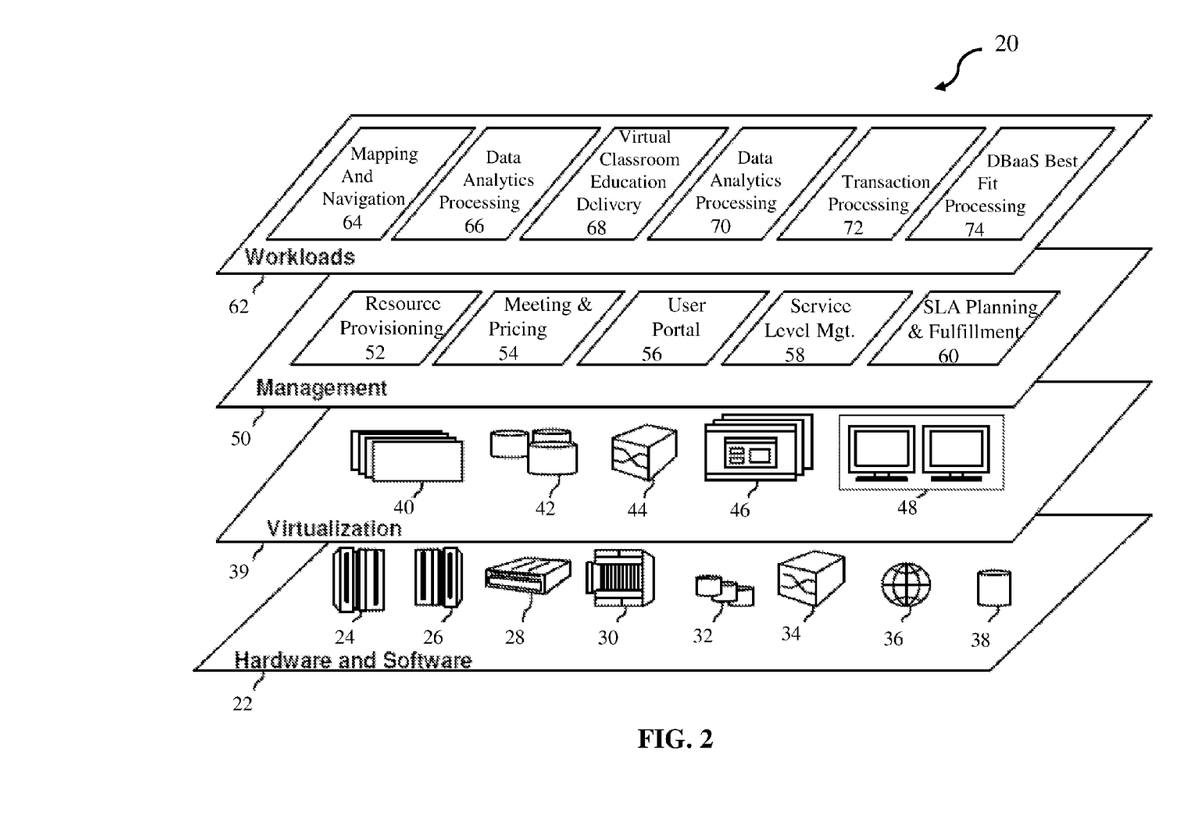
FIG. 2 depicts a set of abstraction model layers according to one embodiment.

Referring now to FIG. 2, a set of functional abstraction layers 20 provided by cloud computing environment 10 (as depicted in FIG. 1) is shown. It should be appreciated that the components, layers, and functions of functional abstraction layers 20 depicted in FIG. 2 are illustrative only, and embodiments of the invention are not limited thereto. As depicted, the following layers and corresponding functions are provided:

A hardware and software layer 22 may include hardware and software components. Examples of hardware components can include, for example, mainframes 24, RISC (Reduced Instruction Set Computer) architecture based servers 26, servers 28, blade servers 30, storage devices 32, and networks and networking components 34. In some embodiments, software components include network application server software 36 and database software 38.

A virtualization layer 39 may provide an abstraction layer from which the following examples of virtual entities may be provided: virtual servers 40, virtual storage 42, virtual networks 44, which may include virtual private networks, virtual applications and operating systems 46, and virtual clients 48.

In one example, a management layer 50 may provide the functions described below. A resource provisioning module 52 can provide dynamic procurement of computing resources and other resources that may be utilized to perform tasks within the cloud computing environment. A metering and pricing resource 54 may provide cost tracking as resources are utilized within the cloud computing environment, and billing or invoicing for consumption of these resources. In one example, metering and pricing resources may include application software licenses. A user portal 56 may provide access to cloud computing environment 10 for consumers and system administrators (not shown). In some embodiments, user portal 56 may provide security and/or identity verification for cloud consumers (e.g., one or more consumers operating one or more of devices 14-19) and tasks, as well as protection for data and other resources. A service level management resource 58 can provide cloud computing resource allocation and management such that required service levels are met. A service level agreement (SLA) planning and fulfillment resource 60 may provide pre-arrangement for, and procurement of cloud computing resources for which a future requirement is anticipated in accordance with an SLA.

A workloads layer 62 may provide functionality for which the cloud computing environment may be utilized. For example, workloads layer 62 may include a mapping and navigation resource 64, a software development and lifecycle management resource 66, a virtual classroom education delivery resource 68, a data analytics processing resource 70, a transaction processing resource 72, and a DBaaS best fit processing resource 74.

FIG. 3 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody devices in hardware and software layer 22, and may function as a cloud computing node 12. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 3, the computer 100 includes processor 101. Computer 100 also includes memory 102 coupled to processor 101, and one or more input/output adaptors 103 that may be communicatively coupled via system bus 105. Memory 102 may be operatively coupled to one or more internal or external memory devices. Communications adaptor 104 may be operatively connect computer 100 to one or more networks 115. A system bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 3, the instructions in memory 102 may include an operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more input/output (I/O) devices to computer 100. For example, interface adaptor 112 may connect a keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

A network of interconnected cloud computing nodes (e.g., cloud computing nodes 12) is at the heart of a DBaaS database infrastructure. In public, private, community, and hybrid cloud environments, there may be different types of agents in the cloud database, one of them being a coordinator agent. The coordinator agent may be any one of cloud computing nodes 12, and configured to communicate with the application, receive query requests, and send replies.

In conventional DBaaS database infrastructures, the coordinator agent is selected by a receiving node that receives a query either by a software utility or hard code in the receiving node. The coordinator agent can either satisfy the request itself, or delegate the work to multiple subagents to work on the request. For example, when an application issues a query to the cloud, parts of the database request is sent by the coordinator node to subagents at the other partitions. All results from the other partitions are consolidated at the coordinator node before being sent back to the application. Therefore an incorrectly defined coordinator node, which may be determined by hard code or a software utility in conventional DBaaS systems, will significantly impact query performance and response time in addition to burdening the network and other resources.

Therefore, it may be advantageous to provide a system and method for automatically determining an optimum coordinator node in a distributed database cloud for a particular application request. It may also be advantageous to equip the system to determine the coordinator node based on the physical location of the data set requested, and/or transparently change the coordinator node if the node was pre-selected by another selection mechanism.

Figure 4:
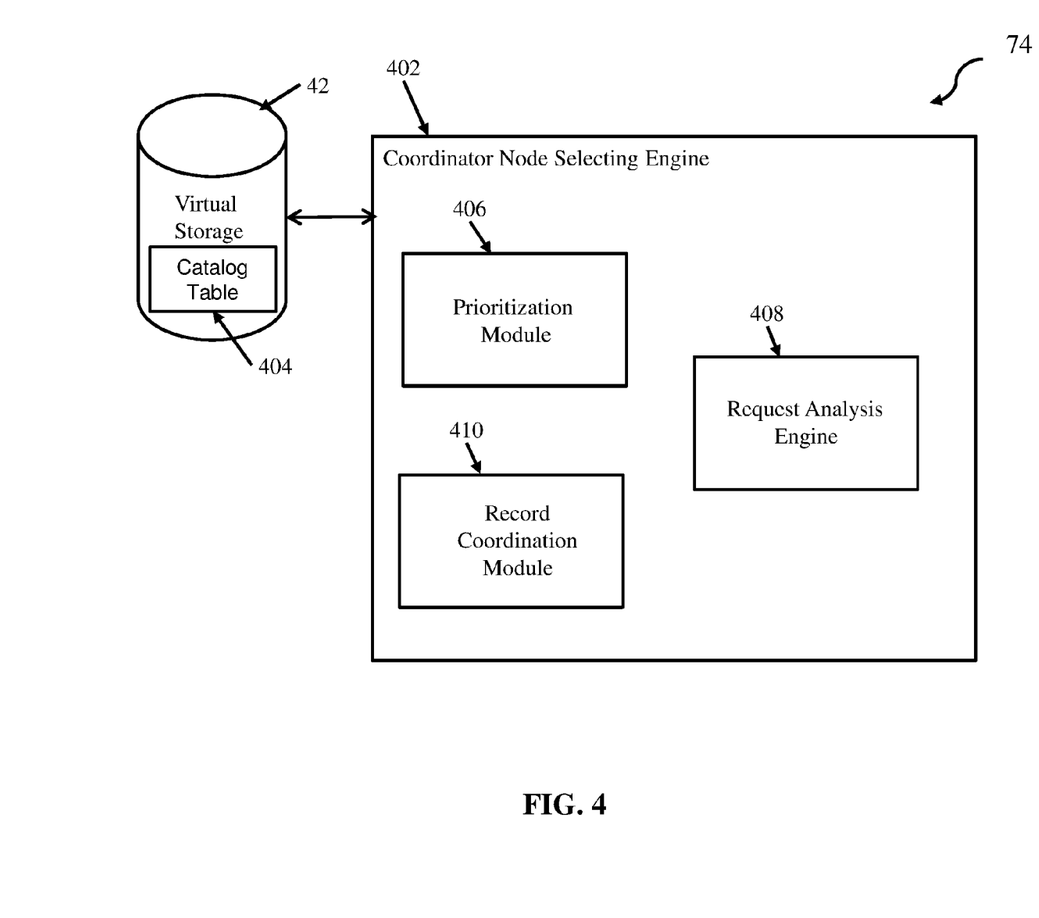
FIG. 4 depicts a coordinator node selecting engine according to one embodiment.

FIG. 4 depicts a DBaaS Best Fit Processing Resource 74 (hereafter "best fit resource"), according to some embodiments. Referring now to FIG. 4, DBaaS best fit processing resource 74 may include a coordinator node selecting engine 402 (hereafter "selecting engine 402"), which may be operatively connected to virtual storage 42.

Virtual storage 42 may include one or more database resources including, for example, a catalog table 404. For example, database software 38 may cause one of cloud computing nodes 12 (shown in FIG. 1) to access virtual storage 42, read from, and write information related to management of cloud computing environment 10. In some aspects, a node (e.g., laptop computer 18) may write a comparison record to catalog table 404 that may be indicative of a priority metric of an application operating on a node in environment 10.

Selecting engine 402 may be configured to cause processor 101 (shown in FIG. 3) to perform the methods described herein, and may include a prioritization module 406, a request analysis engine 412, and a coordination module 410. Prioritization module 406, request analysis engine 412, and coordination module 410 may be configured to operate as part of DBaaS best fit processing resource 74 and/or resource provisioning module 52. Selecting engine 402 may be configured to operate on any of computing nodes 12. For example, selecting engine 402 may be configured on mobile device 14, desktop computer 16, laptop computer 18, servers 28, and blade servers 30.

According to some embodiments, a transmitting node (e.g., desktop computer 16) may send a query having an application request that requests access to environment 10 data stored on one or more of cloud computing nodes 12. A receiving node configured with selecting engine 402 may receive the application connect request having data request information, and select (randomly) any node in cloud computing nodes 12 as a candidate node that may be suitable as a coordinator node. In some aspects, selecting engine 402 may determine whether the candidate node is overloaded, make a comparison of the relative priority of the randomly selected node (the priority of which may be stored in a database resource such as, for example, catalog table 404), update catalog table 404 with a comparison record, and select the candidate node if it is an optimal fit for the data associated with the application connect request.

Prioritization module 406 may be configured to perform a query to catalog table 404 regarding the candidate node priority to determine the node priority, which may be predefined based on the characteristic of the node. For example, one of servers 28 may be dedicated (or substantially allocated) to providing mission-critical data or be otherwise important to a critical resource. Catalog table 404 may include a predefined node priority that indicates that server 28 has a relative "high" priority (in contrast with laptop computer 18, which may be readily available to perform coordination agent tasks and have a "lower" relative priority). Although many predefined priority levels are contemplated, it is understood that priority levels may be set according to any node's operational importance, and may be one of many characteristics used to determine whether a candidate node is an appropriate selection as the coordinator node.

Request analysis engine 408 may be configured to receive the node priority level retrieved by prioritization module 406, and analyze the characteristic of the data request from the data request information to determine a relative priority level of the requested data identified in the data request information with respect to the node priority level. For example, request analysis engine 408 may determine whether the candidate node is overloaded is based on a predetermined threshold. The threshold may be predetermined in that is indicates a level of processing activity of the candidate node, which may be known in advance, and recorded in a table. Request analysis engine may then select the candidate node is based on the data request information, the comparison record, or indicate that the node is not an appropriate match for that particular application connect request.

In other aspects, the data request information may include information indicative of the characteristic and location of requested data in a query. For example, the query may request information from a remote server having multiple layers of authentication. Request analysis engine 408 may perform a comparison and generate a comparison record based on the comparison.

According to other embodiments, the catalog table may indicate a relative percentage of information requested in the data request information with respect to each node in the DBaaS infrastructure. For example, catalog table 404 may include information indicative that 85% of the data requested in the application connect request lives on two servers directly connected to desktop computer 16. Accordingly, request analysis engine 408 may use this information by applying a relative weight in the analysis, which may militate toward desktop computer 16 being an optimal selection for the coordinator node. It should be appreciated that a threshold percentage of 85% is exemplary only, and may be any predetermined threshold.

When request analysis engine 408 makes a determination regarding a comparison of the predefined priority metric to the predefined node priority of a candidate node, it may takes into consideration the weighted data location information. In some aspects request analysis engine 408 may generate a comparison record, which may include a determination of how the location of the data and the relative importance (priority) of the resource(s) on which that data is stored. Accordingly, analysis engine 408 may forward the comparison record to record coordination module 410. Record coordination module 410 may be configured to write the comparison record to catalog table 404.

Figure 5:
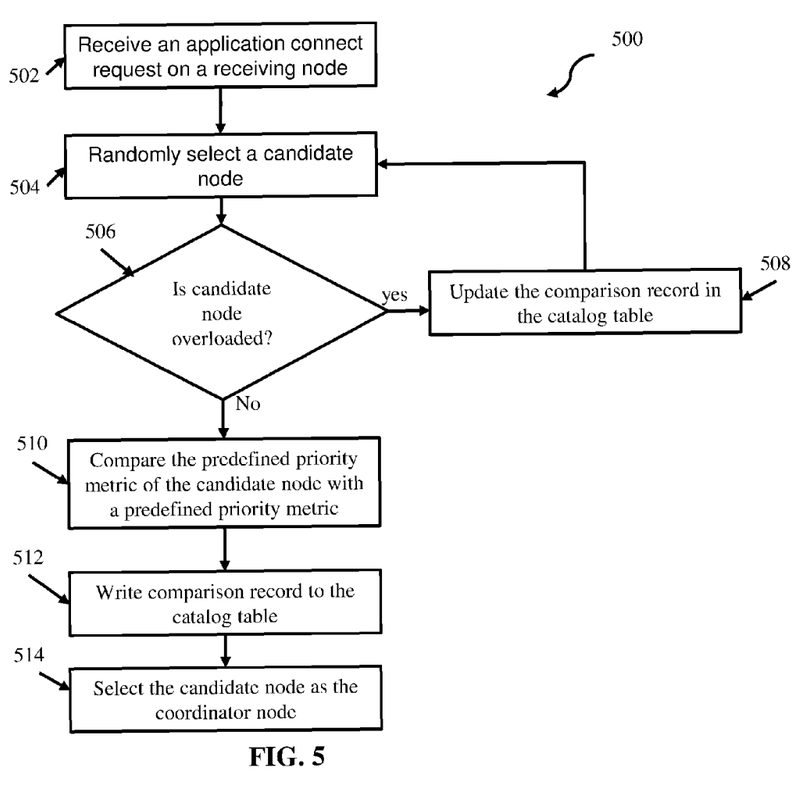
FIG. 5 depicts computer-implemented method for determining a coordinator node in a database as a service (DBaaS) infrastructure according to one embodiment.

FIG. 5 depicts computer-implemented method 500 for determining a coordinator node in a database as a service (DBaaS) infrastructure, according to some embodiments. Referring now to FIG. 5, according to some embodiments, as shown in block 402, processor 101 may receive, on a receiving node, an application connect request having data request information, where the data request information may refer to data stored in the DBaaS infrastructure (e.g., functional abstraction layers 20 operating in conjunction with cloud computing nodes 12). The data request information may include a predefined priority metric, as discussed above with respect to FIG. 4. The data request information may include information indicative of the characteristic and location of requested data in a query. For example, the query (e.g., the application connect request) may reference or request data stored on a mainframe computer known to store and manage sensitive data. "Sensitive data" may be one indication of the characteristic of the requested data in the query. In other aspects, the location may be a physical location of the server, which may include the intervening connections between the receiving node and the server location.

According to some embodiments, DBaas best fit processing resource 74 may work by randomly selecting a node, analyzing the node for its relative strength as a coordinating node, and either select the node or move on to other nodes in the DBaaS infrastructure. After receiving an application connect request, as shown in block 504, processor 101 may randomly select a candidate node from the DBaaS infrastructure, and determine whether the candidate node is overloaded, as shown in decision block 506.

In some aspects, processor 101 may be configured to determine whether the candidate node is overloaded based on a predetermined threshold indicative of a level of processing activity of the candidate node. For example, if the predetermined threshold of processing activity for the candidate node is set at 65% of the node processing capacity (the predetermined threshold for which may be stored in catalog table 404), and processor 101 observes by querying the candidate node that the current processing load of the candidate node is currently at 55%, processor 101 may determine that the candidate node is close to being overloaded (or would be overloaded if selected to be the coordinator node). In other aspects, processor may query the candidate node and determine that the current processing load is much lower and make a determination that the candidate node is not overloaded.

Responsive to determining that the candidate node is not overloaded, as shown in block 510, processor 101 may compare the predefined priority metric to at least one predefined node priority stored in catalog table 404. The predefined priority metric may include a relative priority of the requested data referenced in the data request information, which may also be stored in catalog table 404.

As shown in block 512, processor 101 may write a comparison record indicative of a comparison of the predefined priority metric with the at least one predefined node priority in the candidate node, where the comparison record is stored in catalog table 404.

Processor 101 may the select the candidate node as the coordinator node, as shown in block, 514.

If, as shown in decision block 506, processor 101 determines that the first candidate node is overloaded, then processor 101 may create an overload record in catalog table 404, as shown in block 408, and randomly select another candidate node.

With a correctly defined coordinator node, the methods and systems described herein may significantly improve query performance and response time in addition to avoidance of burdening network and other resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a coordinator node in a database as a service (DBaaS) infrastructure comprising:
   receiving, via a processor on a receiving node, an application connect request having data request information, wherein the data request information refers to data stored in the DBaaS infrastructure and includes a predefined priority metric;
   selecting, via the processor, a candidate node in the DBaaS infrastructure;
   determining, via the processor, whether the candidate node is overloaded;

comparing, via the processor, responsive to determining that the candidate node is not overloaded, the predefined priority metric to at least one predefined node priority;

writting, to a memory, a comparison record indicative of a comparison of the predefined priority metric with the at least one predefined node priority in the candidate node, wherein comparison record is stored in a catalog table; and selecting, via the processor, the candidate node as the coordinator node.

2. The computer-implemented method of claim 1, wherein determining whether the candidate node is overloaded is based on a predetermined threshold indicative of a level of processing activity of the candidate node.

3. The computer-implemented method of claim 1, wherein selecting the candidate node is based on the data request information and the comparison record.

4. The computer-implemented method of claim 1, wherein the data request information includes information indicative of a characteristic and location of requested data in a query.

5. The computer-implemented method of claim 1, wherein selecting the candidate node further comprises, responsive to determining that the candidate node is overloaded;

writing, to the memory, an overload record indicative that the candidate node is at operative capacity and cannot be a coordinating node;

selecting a second candidate node;

comparing, via the processor, the predefined priority metric to at least one predefined node priority metric in the second candidate node;

writing, to a memory, a second comparison record indicative of a comparison of the predefined priority metric to the predefined node priority in the second candidate node; and selecting, via the processor, the second candidate node based on the data request information and the comparison record.

6. The computer-implemented method of claim 5, wherein:

the DBaaS infrastructure comprises a plurality of nodes; and a catalog table indicates a relative percentage of information requested in the data request information with respect to each node in the DBaaS infrastructure.

7. The computer-implemented method of claim 6, wherein selecting the second candidate node is based on the data request information and the comparison record.

8. A system for determining a coordinator node in a database as a service (DBaaS) infrastructure comprising a processor configured to:

receive, on a receiving node, an application connect request having data request information, wherein the data request information refers to data stored in the DBaaS infrastructure and includes a predefined priority metric;

select a candidate node in the DBaaS infrastructure;

determine whether the candidate node is overloaded;

compare, responsive to determining that the candidate node is not overloaded, the predefined priority metric to at least one predefined node priority;

write a comparison record indicative of a comparison of the predefined priority metric with the at least one predefined node priority in the candidate node, wherein the comparison record is stored in a catalog table; and select the candidate node as the coordinator node.

9. The system of claim 8, wherein the processor is configured to determine whether the candidate node is overloaded is based on a predetermined threshold indicative of a level of processing activity of the candidate node.

10. The system of claim 8, wherein the processor is configured to select the candidate node is based on the data request information and the comparison record.

11. The system of claim 8, wherein the data request information includes information indicative of a characteristic and location of requested data in a query.

12. The system of claim 8, wherein responsive to determining that the candidate node is overloaded, the processor is configured to:

Write an overload record to the memory indicative that the candidate node is at operative capacity and cannot be a coordinating node;

select a second candidate node;

compare the predefined priority metric to at least one predefined node priority metric in the second candidate node;

write a second comparison record indicative of a comparison of the predefined priority metric to the predefined node priority in the second candidate node, wherein the second comparison record is stored in the catalog table; and select the second candidate node as the coordinator node based on the data request information and the comparison record.

13. The system of claim 12, wherein the DBaaS infrastructure comprises a plurality of nodes; and a catalog table indicates a relative percentage of information requested in the data request information with respect to each node in the DBaaS infrastructure.

14. The system of claim 13, wherein the data request information includes information indicative of a characteristic and location of requested data in a query.

15. A computer program product for determining a coordinator node in a database as a service (DBaaS) infrastructure, the computer program product comprising a computer readable storage medium having program instructions embodied therewith, wherein the computer readable storage medium is not a transitory signal per se, the program instructions executable by a processor to cause the processor to perform a method comprising:

receiving, via a processor on a receiving node, an application connect request having data request information, wherein the data request information refers to data stored in the DBaaS infrastructure and includes a predefined priority metric;

selecting, via the processor, a candidate node in the DBaaS infrastructure;

determining, via the processor, whether the candidate node is overloaded;

comparing, via the processor, responsive to determining that the candidate node is not overloaded, the predefined priority metric to at least one predefined node priority;

writing, to a memory, a comparison record indicative of a comparison of the predefined priority metric with the at least one predefined node priority in the candidate node, wherein the comparison record is stored in a catalog table, wherein the comparison record is stored in a catalog table; and selecting, via the processor, the candidate node as the coordinator node.

16. The computer program product of claim 15, wherein determining whether the candidate node is overloaded is based on a predetermined threshold indicative of a level of processing activity of the candidate node.

17. The computer program product of claim 15, wherein the processor is configured to select the candidate node is based on the data request information and the comparison record.

18. The computer program product of claim 15, wherein selecting the candidate node further comprises, responsive to determining that the candidate node is overloaded:

writing, to the memory, an overload record indicative that the candidate node is at operative capacity and cannot be a coordinating node;

selecting a second candidate node;

comparing, via the processor, the predefined priority metric to at least one predefined node priority metric in the second candidate node;

writing, to a memory, a second comparison record indicative of a comparison of the predefined priority metric to the predefined node priority in the second candidate node, wherein the second comparison record is stored in the catalog table; and selecting, via the processor, the second candidate node based on the data request information and the comparison record.

19. The non-transitory storage medium of claim 15, wherein the DBaaS infrastructure comprises a plurality of nodes; and the catalog table indicates a relative percentage of information requested in the data request information with respect to each node in the DBaaS infrastructure.

20. The computer program product of claim 19, wherein selecting the second candidate node based on the data request information and the comparison record.

* * * * *